(12) United States Patent
Ge et al.

(10) Patent No.: US 8,787,200 B2
(45) Date of Patent: Jul. 22, 2014

(54) DEVICE, SYSTEM, AND METHOD FOR AUTOMATICALLY CONFIGURING APPLICATION TERMINALS IN HOME NETWORK

(75) Inventors: Zetian Ge, Shenzhen (CN); Yi Tan, Shenzhen (CN); Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 12/604,201

(22) Filed: Oct. 22, 2009

(65) Prior Publication Data

US 2010/0039958 A1 Feb. 18, 2010

Related U.S. Application Data

(63) Continuation-in-part of application No. PCT/CN2008/070776, filed on Apr. 23, 2008.

(30) Foreign Application Priority Data

Apr. 23, 2007 (CN) .......................... 2007 1 0097938

(51) Int. Cl.
*H04L 12/28* (2006.01)
*H04L 12/66* (2006.01)
*H04L 12/24* (2006.01)

(52) U.S. Cl.
CPC ............ *H04L 12/66* (2013.01); *H04L 41/0886* (2013.01); *H04L 12/2803* (2013.01)
USPC ............ 370/254; 370/352; 370/401; 709/223

(58) Field of Classification Search
USPC .................. 370/254, 255, 351, 352, 357, 401; 709/220–223
See application file for complete search history.

(56) References Cited

U.S. PATENT DOCUMENTS 6,427,170 B1 * 7/2002 Sitaraman et al. ............ 709/226
7,099,338 B1    8/2006 Lee
(Continued)

FOREIGN PATENT DOCUMENTS

CN    1863218 A    11/2006
CN    1866855 A    11/2006
(Continued)

OTHER PUBLICATIONS

European Patent Office Communication pursuant to Article 94(3) EPC, European search opinion for Application No. 08734134.3, mailed Jan. 10, 2011, Huawei Technologies Co., Ltd 4 pgs.

(Continued)

*Primary Examiner* — Hassan Phillips
*Assistant Examiner* — Saba Tsegaye
(74) *Attorney, Agent, or Firm* — Conley Rose, P.C.; Grant Rodolph; Nicholas K. Beaulieu

(57) ABSTRACT

A device, a system, and a method for automatically configuring application terminals in a home network are disclosed. The method is as follows. A home gateway receives identifier information of an application terminal sent by the application terminal through a Dynamic Host Configuration Protocol (DHCP). The identifier information of the application terminal is sent to a public network through a DHCP message, so as to determine a DHCP server corresponding to an automatic configuration server (ACS) of the application terminal. Address information of the ACS of the application terminal is obtained from the DHCP server on the public network through a DHCP message. The address information is transmitted to the application terminal, so that the application terminal obtains configuration information from the ACS according to the address information to perform an auto-configuration. Thus, a problem that the application terminal in a home network cannot directly obtain an ACS Universal Resource Locator (URL) through a DHCP message is solved, so that an auto-configuration of the application terminal is realized.

12 Claims, 3 Drawing Sheets

(56) References Cited

U.S. PATENT DOCUMENTS

| | | | |
|---|---|---|---|
| 2002/0073182 | A1 | 6/2002 | Zakurdaev et al. |
| 2005/0243801 | A1 | 11/2005 | Grubb |
| 2006/0015513 | A1 | 1/2006 | Poyhonen et al. |
| 2006/0120171 | A1* | 6/2006 | Touati et al. ............. 365/189.05 |
| 2006/0120305 | A1* | 6/2006 | Van Den Bosch et al. ... 370/254 |
| 2006/0271665 | A1 | 11/2006 | Abe |
| 2007/0061430 | A1 | 3/2007 | Kim |
| 2007/0067431 | A1* | 3/2007 | Yoshihara et al. ............ 709/223 |
| 2007/0091841 | A1* | 4/2007 | Bhushan et al. .............. 370/329 |
| 2007/0127506 | A1* | 6/2007 | Absillis ......................... 370/401 |
| 2007/0143480 | A1* | 6/2007 | Arroyo et al. ................. 709/226 |
| 2007/0180142 | A1* | 8/2007 | Small et al. ................... 709/245 |
| 2007/0201508 | A1* | 8/2007 | Blackford et al. ............ 370/466 |
| 2008/0137673 | A1* | 6/2008 | Phuah et al. ................... 370/401 |
| 2008/0304500 | A1* | 12/2008 | Schliserman et al. ........ 370/401 |
| 2009/0064268 | A1* | 3/2009 | Straub et al. .................. 725/152 |
| 2010/0198989 | A1* | 8/2010 | Jia et al. ........................ 709/245 |

FOREIGN PATENT DOCUMENTS

| | | |
|---|---|---|
| CN | 1937632 A | 3/2007 |
| CN | 101296203 B | 12/2011 |
| EP | 1 753 207 | 2/2007 |
| WO | 2007007007 A2 | 1/2007 |

OTHER PUBLICATIONS

First Chinese Office Action dated (mailed) Nov. 15, 2010, issued in related Chinese Application No. 200710097938.X Huawei Technologies Co., Ltd.

English translation of the Written Opinion of the International Searching Authority for International application No. PCT/CN2008/070776, mailed Aug. 7, 2008, 3 pgs.

EPO Communication enclosing the extended European search report including, pursuant to Rule 62 EPC, the supplementary European search report (Art. 153(7) EPC) and the European search opinion, dated Mar. 11, 2010, 6 pgs.

Technical Report: DSL Forum; TR-069 "CPE WAN Management PRotocol", DSLHome-Technical Working Group, May 2004, pp. 1-109.

European Patent Office Communication pursuant to Article 94(3) EPC, European search opinion for Application No. 08 734 134.3-2414, mailed Feb. 2, 2012, Huawei Technologies Co., Ltd.

Foreign Communication from a Counterpart Application, European Application No. 08734134.3, Office Action dated Sep. 26, 2012, 3 pages.

* cited by examiner

DEVICE, SYSTEM, AND METHOD FOR AUTOMATICALLY CONFIGURING APPLICATION TERMINALS IN HOME NETWORK

CROSS-REFERENCE TO RELATED APPLICATIONS

The present application is a continuation-in-part of International Application No. PCT/CN2008/070776, filed on Apr. 23, 2008, which claims priority to Chinese Patent Application No. 200710097938.X, filed on Apr. 23, 2007, both of which are hereby incorporated by reference in their entireties.

FIELD OF THE INVENTION

The present invention relates to a network communication field, and more particularly to a device, a system, and a method for automatically configuring application terminals in a home network.

BACKGROUND OF THE INVENTION

Currently, various applications over Internet protocol (IP), for example, IP television (IPTV) and voice over IP (VoIP), are quickly developed, and will increasingly replace private network applications such as cable TV and Public Switched Telephone Network (PSTN) telephone services. Certain configuration needs to be made to enable the IP application terminals to use various applications over IP, for example, an IP address or a Universal Resource Locator (URL) of an application server need to be configured, and a protocol used by the application server needs to be configured.

So far, a mature solution for a 0-configuration of the application terminals does not exist. When a user uses an application terminal after powering on the terminal for the first time, the application terminal can be connected to a network normally only after the user manually configures many parameters, for example, the IP address, a central office server address, a user name, and a password, resulting in unfavorable experience of the user.

If operators/service providers (SPs) manually configure each application terminal, a huge cost is brought to the operators/SPs. Therefore, it is a problem to be solved to realize an auto-configuration on the application terminals.

In the related art, the terminal declares to a dynamic host configuration protocol (DHCP) server that the terminal supports a certain management protocol, for example, TR09, through a DHCP protocol. Then, according to information received from the DHCP server, the terminal sets a URL of an automatic configuration server (ACS) of customer premise equipment (CPE, for example, a home gateway) connected to the terminal. Then, the terminal initiates a connection to the ACS, and obtains a configuration file through the management protocol, for example, the TR09 protocol, thereby realizing the auto-configuration.

However, during a process for implementing the present invention, the inventors find that the application terminal in a home network must access to the Internet through the home gateway including the DHCP server. However, the existing home gateway cannot forward a DHCP message of the application terminal, so a DHCP message sent by the application terminal cannot reach the Internet. Therefore, the method of obtaining the ACS URL by the terminal through a DHCP protocol in the related art is not applicable to the application terminal in the home network managed by the home gateway.

SUMMARY OF THE INVENTION

Various embodiments of the present invention provide a device, a system, and a method for automatically configuring application terminals in a home network, thereby solving a problem that application terminals in a home network cannot directly obtain an ACS URL through a dynamic host configuration protocol (DHCP) protocol.

In view of the above, embodiments of the present invention provide the following technical solutions.

One embodiment of the present invention provides a home gateway, which includes an application terminal identifier information processing module, an automatic configuration server (ACS) address information obtaining module, and an ACS address information sending module.

The application terminal identifier information processing module is configured to receive identifier information of an application terminal sent by the application terminal through a DHCP, and send the identifier information of the application terminal to a public network through a DHCP.

The ACS address information obtaining module is configured to perform an information interaction with a DHCP server on the public network through a DHCP, and obtain address information of an ACS of the application terminal from the DHCP server, in which the DHCP server is configured to determine the address information of the ACS of the application terminal according to the identifier information of the application terminal.

The ACS address information sending module is configured to send the address information of the ACS obtained by the ACS address information obtaining module to the application terminal through a DHCP.

One embodiment of the present invention provides a system for automatically configuring application terminals in a home network, which includes an application terminal, a home gateway, and a DHCP server.

The home gateway is configured to receive identifier information of an application terminal sent by the application terminal through a DHCP, send the identifier information of the application terminal to a public network through a DHCP, perform information interaction with a DHCP server on the public network, obtain address information of an ACS of the application terminal from the DHCP server, and send the address information of the ACS to the application terminal through a DHCP.

The DHCP server is configured to save the address information of the ACS and identifier information of all application terminals registered on the ACS, judge that the application terminal is managed by the ACS according to the identifier information of the application terminal sent by the home gateway and the saved identifier information of all of the application terminals, and then send the address information of the ACS to the home gateway.

The application terminal is configured to send the identifier information of the application terminal to the home gateway through a DHCP, receive the address information of the ACS sent by the home gateway through a DHCP, and obtain configuration information from the ACS according to the address information of the ACS to perform an auto-configuration.

One embodiment of the present invention provides a method for automatically configuring application terminals in a home network, which includes the steps as follows.

A home gateway receives identifier information of an application terminal sent by the application terminal through a DHCP, and sends the identifier information of the application terminal to a public network through a DHCP, so as to determine a DHCP server corresponding to an ACS of the application terminal. The home gateway obtains address information of the ACS of the application terminal from the DHCP server through a DHCP, and transmits the address information to the application terminal, so that the application terminal obtains configuration information from the ACS according to the address information to perform an auto-configuration.

One embodiment of the present invention provides a DHCP server, which includes an ACS information saving module, a judging and processing module, and an ACS address information sending module.

The ACS information saving module is configured to save address information of an ACS, and all identifier information of an application terminal registered on the ACS.

The judging and processing module is configured to, search an identifier information of an application terminal sent by a home gateway in the identifier information of all of the application terminals saved in the ACS information saving module and judge whether the application terminal is managed by the ACS.

The ACS address information sending module is configured to send the address information of the ACS to the home gateway when the judging and processing module judges that the application terminal is managed by the ACS, so that the application terminal receives the address information from the home gateway through a DHCP, and obtains configuration information from the ACS according to the address information to perform an auto-configuration.

One embodiment of the present invention provides a method for automatically configuring application terminals, which includes the steps as follows.

A DHCP server on a public network judges whether an application terminal is managed by an ACS according to identifier information of all application terminals registered on the ACS saved in the DHCP server after receiving identifier information of the application terminal sent by a home gateway through a DHCP.

The DHCP server sends address information of the ACS saved in the DHCP server to the home gateway through a DHCP after judging that the application terminal is managed by the ACS, so that the application terminal receives the address information from the home gateway through a DHCP, and obtains configuration information from the ACS according to the address information to perform an auto-configuration.

It may be known from the technical solutions according to the embodiments of the present invention that, in the embodiments of the present invention, the home gateway uses DHCP agent to replace the application terminal to find the DHCP Server, obtains the ACS URL of the ACS of the application terminal from the DHCP server, and sends the ACS URL to the application terminal, thereby solving a problem that the application terminal in the home network cannot directly obtain the ACS URL through the DHCP protocol. Thus, a user can normally use the application terminal without configuring any parameters.

DETAILED DESCRIPTION OF THE EMBODIMENTS

In embodiments, the present invention provides a device, a system, and a method for automatically configuring application terminals in a home network.

A solution for performing an auto-configuration i.e. a 0-configuration, on the application terminals in the home network according to the embodiment of the present invention is realized by using a DHCP server and a home gateway. In the solution, the home gateway implements functions of a DHCP agent, finds the DHCP Server, obtains an ACS URL of the application terminal from the DHCP Server, and then forwards the ACS URL to the application terminals.

Figure 1:
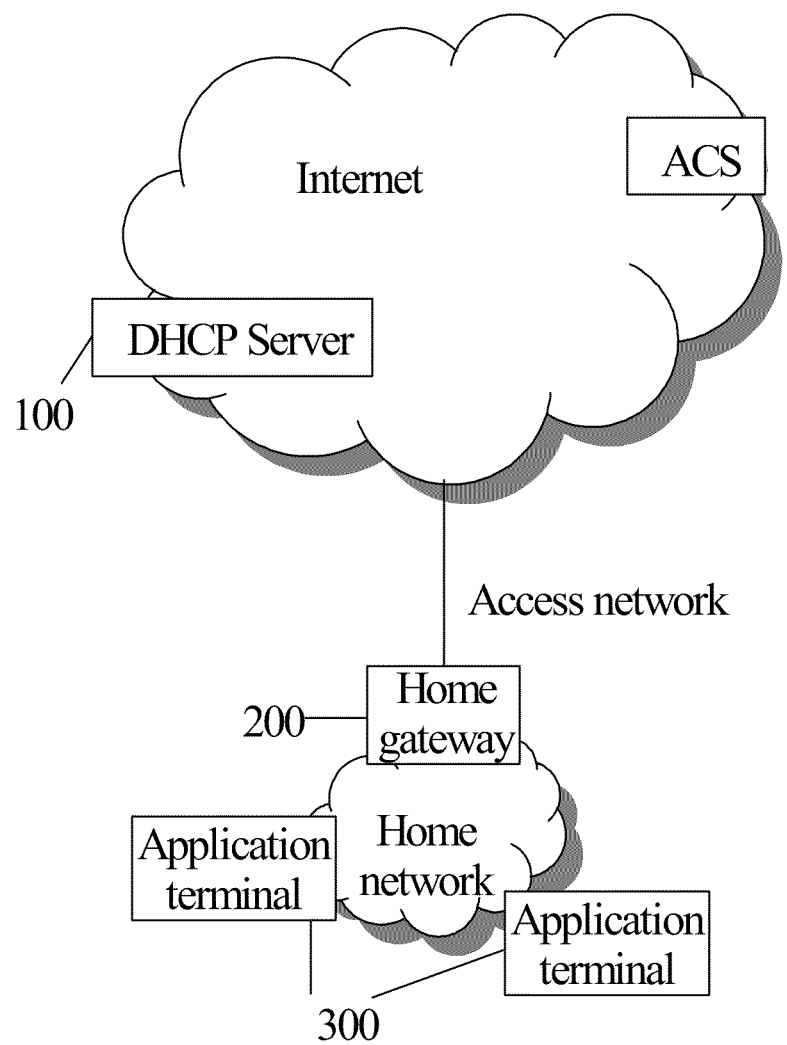
FIG. 1 is a schematic view of the networking of a system for automatically configuring application terminals in a home network according to an embodiment of the present invention.
Figure 2:
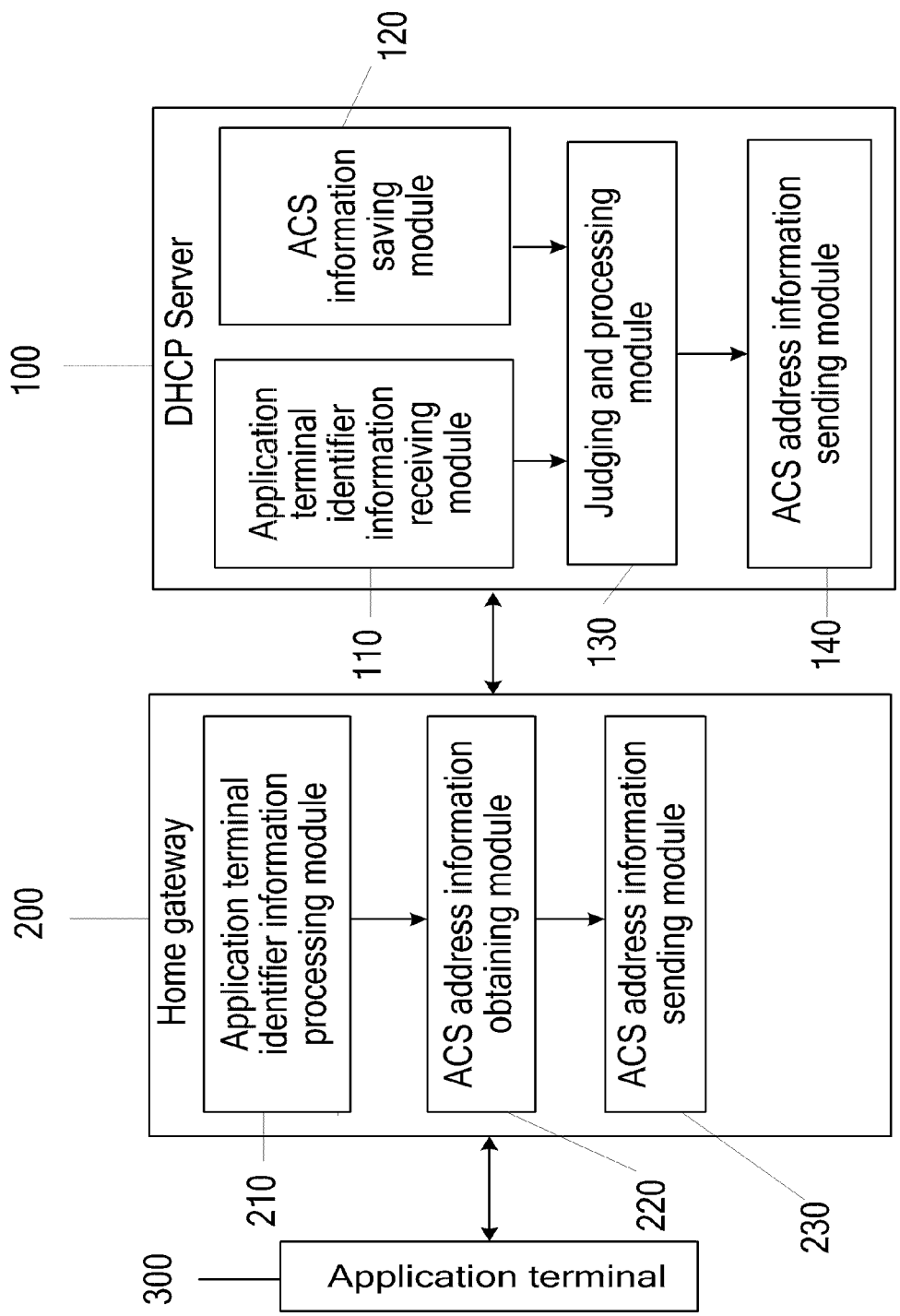
FIG. 2 is a schematic view of a specific structure of the system for automatically configuring the application terminals in the home network according to the embodiment of the present invention.

The embodiment of the present invention is described in detail with the accompanying drawings. FIG. 1 is a schematic view of the networking of a system for automatically configuring application terminals in a home network according to an embodiment of the present invention, and FIG. 2 is a schematic view of a specific structure of the system. The system includes a DHCP Server 100, a home gateway 200, and an application terminal 300.

The ACS performs the auto-configuration and manages terminal devices managed by the ACS according to a certain management protocol, for example, TR069, both network operators and SPs may deploy the ACS, so as to perform the auto-configuration and manage the terminals managed by the ACS. Functions of each module in the system according to the embodiment of the present invention are described in the following respectively.

The home gateway 200 is configured to receive identifier information of the application terminal 300 sent by the application terminal 300 through a DHCP, send the identifier information of the application terminal to a public network through a DHCP, perform information interaction with a DHCP server 100 on the public network, obtain address information of the ACS of the application terminal from the DHCP server 100, and send the address information of the ACS to the application terminal 300 through a DHCP.

The DHCP server 100 is configured to save the address information of the ACS and identifier information of all application terminals registered on the ACS, judge that the application terminal 300 is managed by the ACS according to the identifier information of the application terminal 300 sent by the home gateway 200 and the saved identifier information of all of the application terminals, and then send the address information of the ACS to the home gateway.

The application terminal 300 is configured to send the identifier information of the application terminal 300 to the home gateway 200 through a DHCP, receive the address information of the ACS sent by the home gateway 200 through a DHCP, and obtain configuration information from the ACS according to the address information of the ACS to perform an auto-configuration.

The home gateway 200 particularly includes an application terminal identifier information processing module 210, an ACS address information obtaining module 220, and an ACS address information sending module 230.

The application terminal identifier information processing module 210 is configured to receive the identifier information of the application terminal 300 sent by the application terminal 300 through a DHCP, and send the identifier information of the application terminal 300 to the public network through a DHCP.

The ACS address information obtaining module 220 is configured to perform the information interaction with the DHCP server 100 on the public network through a DHCP, and obtain the address information of the ACS of the application terminal 300 from the DHCP server 100. Particularly, the ACS address information obtaining module performs the information interaction with the DHCP server on the public network through a DHCP by using the identifier information of the application terminal processed by the application terminal identifier information processing module, and obtains the address information of the ACS of the application terminal from the DHCP server.

The ACS address information sending module 230 is configured to send the address information of the ACS obtained by the ACS address information obtaining module to the application terminal 300 through a DHCP.

The home gateway further includes an IP address allocating module.

The IP address allocating module is configured to allocate IP addresses to devices managed by the home gateway in the home network.

The DHCP server 100 includes an ACS information saving module 120, an application terminal identifier information receiving module 110, a judging and processing module 130, and an ACS address information sending module 140.

The ACS information saving module 120 is configured to save the address information of the ACS, and the identifier information of all application terminals registered on the ACS.

The application terminal identifier information receiving module 110 is configured to receive the identifier information of the application terminal 300 sent by the home gateway 200 through a DHCP, and transmit the configuration information to the judging and processing module 130.

The judging and processing module 130 is configured to search an identifier information of an application terminal 300 sent by a home gateway 200 in the identifier information of all of the application terminals saved in the ACS information saving module 120 and judge whether the application terminal 300 is managed by the ACS or not.

The ACS address information sending module 140 is configured to send the address information of the ACS to the home gateway 200 when the judging and processing module 130 judges that the application terminal is managed by the ACS.

Figure 3:
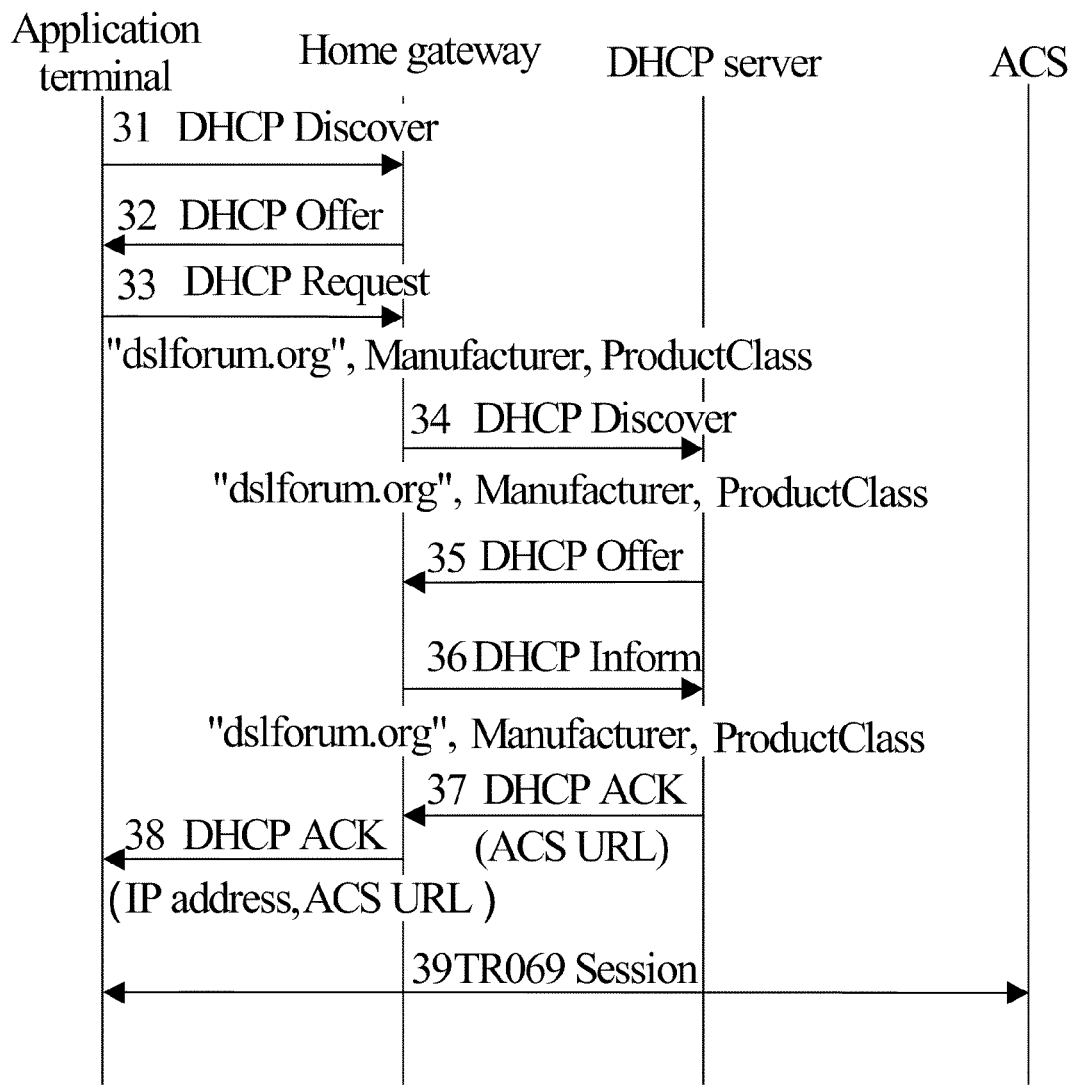
FIG. 3 is a flow chart of a method according to an embodiment of the present invention.

Taking a configuration management protocol defined by TR069 for example, referring to FIG. 3, a processing flow of the method according to the embodiment of the present invention includes the steps as follows.

In Step 31, an application terminal sends a DHCP Discover message, and discovers a DHCP server through the DHCP Discover message.

In Step 32, in a home network, the DHCP server is deployed on the home gateway, and the home gateway allocates private network IP addresses to all the devices (including the application terminal) in the home network. The DHCP server on the public network allocates a public network IP address to the home gateway.

After receiving the DHCP Discover message sent by the application terminal, the home gateway replies a DHCP Offer message to the application terminal.

In Step 33, after receiving the DHCP Offer message, the application terminal sends a DHCP Request message to acknowledge the IP address allocated by the home gateway.

The application terminal declares a supported management protocol, for example, TR069, to the home gateway through manufacturer class identifiers, for example, Option 60 Vendor class identifier and Option 61 Client-identifier, defined by the DHCP by utilizing the IP address allocated by the home gateway.

A string "dslforum.org" specified by TR069 is carried in the Option 60 Vendor class identifier, and relevant identifier information of the application terminal in the TR069 is carried in the Option 61 Client-identifier. The relevant identifier information includes manufacturer information, a product class, a device unique identifier, and other information.

In Step 34, the home gateway obtains the information carried in the Option 60 Vendor class identifier and the Option 61 Client-identifier, and sends the DHCP Discover message carrying the obtained information to the public network, so as to obtain the information about the DHCP server on the public network deployed by the SP of the application terminal.

The objective of the home gateway sending the DHCP Discover message is not to apply for the IP address. Therefore, the DHCP Discover message needs to carry necessary information to indicate that the new IP address is not required according to the specification of the DHCP protocol, for example, the IP address of the home gateway is carried in an Option 50 Requested IP Address.

In the embodiment of the present invention, the ACS URL of the ACS, the identifier information of all application terminals registered on the ACS, and other information need to be pre-saved in the DHCP server on the public network.

In Step 35, the DHCP server receiving the DHCP Discover message sent by the home gateway firstly identifies the string "dslforum.org" in the DHCP Discover message. If the DHCP server cannot identify the string "dslforum.org", according to the DHCP protocol, the DHCP server does not respond to the DHCP Discover message.

When the DHCP server can identify the string "dslforum.org", the DHCP server continues to identify the relevant identifier information of the application terminal in the DHCP Discover message, that is, the manufacturer information, the product class, the device unique identifier, and other information in the TR069. If the DHCP server saves the relevant identifier information of the application terminal, it indicates that the application terminal sending the manufacturer class identifier, for example, Option 60 Vendor class identifier and Option 61 Client-identifier, is managed by the DHCP server, the application terminal registers the service on the SP, and the DHCP server sends the DHCP Offer message back to the home gateway.

If the DHCP server does not save the relevant identifier information of the application terminal, it indicates that the application terminal sending the manufacturer class identifier, for example, Option 60 Vendor class identifier and Option 61 Client-identifier, is not managed by the DHCP server, and the DHCP server sends a rejection response back to the home gateway.

In Step 36, after receiving the DHCP Offer message, the home gateway sends a DHCP Inform message to the DHCP server sending the DHCP Offer message, and the information carried in the DHCP Inform message is the same as that in the DHCP Discover.

In Step 37, after receiving the DHCP Inform message, the DHCP server sends a DHCP ACK message back to the home gateway, and carries the ACS URL of the application terminal and other information in the Option 43 Vendor-Specific Information in the DHCP ACK message according to the TR069 definition.

In Step 38, the home gateway sends the DHCP ACK back to the application terminal, and carries the ACS URL and other information obtained from the DHCP Server on the public network in the Option 43 Vendor-Specific Information in the DHCP ACK message.

In Step 39, after the steps are completed, the application terminal obtains the ACS URL, and then obtains configuration data from the ACS according to the TR069 standard protocol, so as to perform the auto-configuration according to the obtained configuration data.

The application terminal in the processing flow includes, but is not limited to, the following wide band terminals, for example, a video phone, an IPTV set-top box, and an IP telephone.

The processing flow is only an embodiment, and in actual applications, a processing sequence of the steps in the processing flow may be adjusted.

For example, Steps 34 to 37 may be performed between Step 31 and Step 32. At this time, the relevant information of the DHCP Discover message of Step 31 is carried in the Option 60 Vendor class identifier and the Option 61 Client-identifier.

Further, the ACS URL information in Step 37 may be offered in the DHCP Offer message in the Step 35; as such, Steps 36 and 37 may be omitted. Similarly, the ACS URL information sent by the home gateway back to the application terminal may also be offered in Step 32.

In the embodiment of the present invention, the home gateway replaces the application terminal to find the DHCP Server, obtains the ACS URL of the application terminal from the DHCP Server, and sends the ACS URL to the application terminal, thereby solving the problem that the application terminal in the home network cannot directly obtain the ACS URL through a DHCP, and the user can use the application terminal normally without configuring any parameters. Thus, the user experience is improved greatly. In addition, the ACS URL does need to be preset in the application terminal, so as to realize the real auto-configuration, which is helpful for retail of the application terminal.

The invention being thus described, the embodiments of the present invention are given, and they are not intended to limit the scope of the present invention. Any modifications, equivalent substitutions, and variations made within the scope of the present invention by those skilled in the art, for example, a Simple Network Management Protocol (SNMP) V3 is used to replace the TR069 protocol, and an SNMP network management server is used to replace the ACS, fall within the scope of the present invention. Therefore, the protective scope of the present invention shall be defined by the following claims.

What is claimed is:

1. A home gateway, comprising:
    an application terminal identifier information processing module configured to receive a first Dynamic Host Configuration Protocol (DHCP) message sent by an application terminal to the home gateway;
    an automatic configuration server (ACS) address information obtaining module configured to:
        determine whether the first DHCP message sent by the application terminal to the home gateway includes identifier information of the application terminal and a preset character string;
        send a second DHCP message including the identifier information and the preset character string to a DHCP server on a public network; and
        receive a third DHCP message including address information of an ACS of the application terminal from the DHCP server, wherein the DHCP server is configured to use the preset character string to determine whether the identifier information of the application terminal is pre-saved in the DHCP server and find the address information of the ACS of the application terminal according to the identifier information of the application terminal when the identifier information of the application terminal is pre-saved in the DHCP server; and
    an ACS address information sending module configured to send the address information of the ACS obtained by the ACS address information obtaining module to the application terminal.

2. The home gateway according to claim 1, wherein the preset character string comprises a string "dslforum.org."

3. The home gateway according to claim 1, wherein the ACS address information obtaining module is further configured to receive a rejection response from the DHCP server when the DHCP server determines that the identifier information of the application terminal is not pre-saved in the DHCP server.

4. A Dynamic Host Configuration Protocol (DHCP) server, comprising:
    an automatic configuration server (ACS) information saving module configured to save address information of an ACS and identifier information of all application terminals registered on the ACS;
    an application terminal identifier information receiving module configured to receive a second Dynamic Host Configuration Protocol (DHCP) message from a home gateway when the home gateway determines that a first DHCP message sent by an application terminal to the home gateway includes information of the application terminal and a preset character string;
    a judging and processing module configured to:
        judge whether the second DHCP message received by the DHCP server from the home gateway includes the identifier information of the application terminal and the preset character string;
        determine, based on a judgment that the second DHCP message includes the identifier information and the preset character string, whether the DHCP server identifies the preset character string and whether the identifier information is pre-saved in the DHCP server; and
        find, based on a determination that the DHCP server identifies the preset character string and the identifier information is pre-saved in the DHCP server, the address information of the ACS of the application terminal according to the identifier information of the application terminal; and
    an ACS address information sending module configured to send the address information of the ACS to the home gateway.

5. The DHCP server according to claim 4, wherein the judging and processing module is configured to determine whether the identifier information is pre-saved in the DHCP server by searching for the identifier information of the application terminal sent by the home gateway in the identifier information of all of the application terminals saved in the ACS information saving module.

6. The DHCP server according to claim 4, wherein the preset character string comprises a string "dslforum.org."

7. The DHCP server according to claim 4, wherein the ACS address information sending module is further configured to send a rejection response to the application terminal when the judging and processing module determines that the identifier information of the application terminal is not pre-saved in the DHCP server.

8. A method for automatically configuring application terminals in a home network, comprising:

receiving, by a home gateway, a first Dynamic Host Configuration Protocol (DHCP) message sent by an application terminal;

determining, by the home gateway, whether the first DHCP message includes identifier information of the application terminal and a preset character string;

sending, based on a determination that the first DHCP message includes the identifier information of the application terminal and the preset character string, a second DHCP message including the identifier information of the application terminal and the preset character string to a DHCP server on a public network;

receiving a third DHCP message including address information of an automatic configuration server (ACS) of the application terminal from the DHCP server, and when the DHCP server identifies the preset character string, determine that the identifier information of the application terminal is pre-saved in the DHCP server, and find the address information of the ACS of the application terminal according to the identifier information of the application terminal; and sending the address information of the ACS to the application terminal.

9. The method according to claim 8, wherein the preset character string comprises a string "dslforum.org."

10. A method for automatically configuring application terminals, comprising:

saving, by a Dynamic Host Configuration Protocol (DHCP) server on a public network, address information of an automatic configuration server (ACS) and identifier information of all application terminals registered on the ACS;

receiving, by the DHCP server, a second DHCP message from a home gateway when the home gateway determines that a first DHCP message sent by an application terminal to the home gateway includes identifier information of the application terminal and a preset character string;

judging, by the DHCP server on the public network, whether the second DHCP message received by the DHCP server from the home gateway includes identifier information of an application terminal and a preset character string;

determining, by the DHCP server and based on a judgment that the second DHCP message includes the identifier information and the preset character string, whether the DHCP server identifies the preset character string and whether the identifier information is pre-saved in the DHCP server;

finding, by the DHCP server and based on a determination that the DHCP server identifies the preset character string and the identifier information is pre-saved in the DHCP server, the address information of the AC S of the application terminal according to the identifier information of the application terminal; and sending, by the DHCP server, the address information of the ACS to the home gateway.

11. The method according to claim 10, wherein the identifier information of the application terminal comprises manufacturer information, a product class, and a device unique identifier of the application terminal.

12. The method according to claim 10, wherein the preset character string comprises a string "dslforum.org."

\* \* \* \* \*